United States Patent
Sargent et al.

(10) Patent No.: US 8,219,686 B2
(45) Date of Patent: Jul. 10, 2012

(54) METHOD AND COMPUTER PROGRAM PRODUCT UTILIZING MULTIPLE UDP DATA PACKETS TO TRANSFER A QUANTITY OF DATA OTHERWISE IN EXCESS OF A SINGLE UDP PACKET

(75) Inventors: John Sargent, Buckingham (GB); Chris Barton, Steeple Claydon (GB); Dallas Engelken, Hutchinson, KS (US); Guy Roberts, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 669 days.

(21) Appl. No.: 11/898,853

(22) Filed: Sep. 17, 2007

(65) Prior Publication Data
US 2009/0074008 A1    Mar. 19, 2009

(51) Int. Cl.
*G06F 15/16* (2006.01)
(52) U.S. Cl. .......... 709/227; 709/238; 709/245
(58) Field of Classification Search .......... 709/227, 709/238, 245; 370/225
See application file for complete search history.

(56) References Cited

U.S. PATENT DOCUMENTS

| | | | | |
|---|---|---|---|---|
| 7,620,733 | B1 * | 11/2009 | Tzakikario et al. | 709/245 |
| 2002/0184390 | A1 * | 12/2002 | Alkhatib | 709/245 |
| 2004/0010616 | A1 * | 1/2004 | McCanne | 709/238 |
| 2005/0047329 | A1 * | 3/2005 | Almog et al. | 370/225 |
| 2006/0056403 | A1 * | 3/2006 | Pleasant et al. | 370/389 |
| 2007/0073660 | A1 * | 3/2007 | Quinlan | 707/3 |

OTHER PUBLICATIONS

Extension Mecahnism for DNS, Network Working Group, RFC (Request for Comment) 2671, P. Vixie , Aug. 1999.*

* cited by examiner

*Primary Examiner* — Djenane Bayard
(74) *Attorney, Agent, or Firm* — Patent Capital Group

(57) ABSTRACT

A method and computer program product provide the capability to use UDP to send messages that include more data than can be handled by a single UDP packet. A method for performing data transfer implemented in a computer system comprises transmitting a request for data, receiving a response to the request for data comprising a portion of the requested data and an indication that additional data is available, and transmitting a request for additional data.

20 Claims, 5 Drawing Sheets

METHOD AND COMPUTER PROGRAM PRODUCT UTILIZING MULTIPLE UDP DATA PACKETS TO TRANSFER A QUANTITY OF DATA OTHERWISE IN EXCESS OF A SINGLE UDP PACKET

BACKGROUND OF THE INVENTION

1. Field of the Invention

The present invention relates to performing multiple packet User Datagram Protocol (UDP) transfers using pseudo domains and pseudo IP addresses.

2. Description of the Related Art

The Internet uses a set of communications protocols that implement the protocol stack on which the Internet and most private networks run. Two of the most important protocols used on the Internet and on private networks are the Transmission Control Protocol (TCP) and the Internet Protocol (IP), which were also the first two networking protocols defined. Another common protocol used on the Internet and on private networks is the User Datagram Protocol (UDP). Using UDP, programs on networked computers can send short messages, known as datagrams, to one another. There are also a number of other protocols that are commonly, or less commonly used on the Internet and on private networks.

Typically, certain network applications have tended to use particular protocols, due to differences in complexity and capability of the various protocols. For example, accesses to Domain Name Servers (DNSs) are typically performed using UDP. Most DNS queries consist of a single UDP request from the client followed by a single UDP reply from the server. UDP is relatively simple to implement, but is capable of handling single packet messages with no more than 512 bytes of data. If the data size of the response from the DNS exceeds 512 bytes, then most DNSs will attempt to use TCP to send the response, as TCP is capable of handling larger packets and multi-packet messages. However, TCP is considerably more complex than UDP, and many DNS clients cannot correctly switch to using TCP when the DNS response messages are sent using TCP.

A need arises for a technique by which UDP can be used to send messages that include more data than can be handled by a single UDP packet.

SUMMARY OF THE INVENTION

The present invention provides a technique by which UDP can be used to send messages that include more data than can be handled by a single UDP packet. A method for performing data transfer implemented in a computer system comprises transmitting a request for data, receiving a response to the request for data comprising a portion of the requested data and an indication that additional data is available, and transmitting a request for additional data. The method may use User Datagram Protocol. The transmitted request for data may include a domain. The transmitted request for data may comprise a lookup request for a domain sent to a Domain Name Server Blacklist/Real-time Blackhole List. The response may further comprise a pseudo-Internet Protocol address. The pseudo-Internet Protocol address may comprise the indication that additional data is available. The request for additional data may comprise a pseudo-domain indicating that additional data is being requested. The response to the request for data further may comprise an indication of an amount of the additional data that is available. The response may further comprise a pseudo-Internet Protocol address. The pseudo-Internet Protocol address may comprise the indication of the amount of the additional data that is available.

A method for performing data transfer implemented in a computer system comprises a) transmitting a request for data using User Datagram Protocol, b) receiving a response to the request for data using the User Datagram Protocol, the response comprising a portion of the requested data that fits in a User Datagram Protocol packet and an indication that additional data is available, c) transmitting a request for additional data using the User Datagram Protocol, and d) repeating steps b)-c) until a response is received indicating that no additional data is available. The transmitted request for data may include a domain. The transmitted request for data may comprise a lookup request for a domain sent to a Domain Name Server Blacklist/Real-time Blackhole List. The response may further comprise a pseudo-Internet Protocol address. The pseudo-Internet Protocol address may comprise the indication that additional data is available. The request for additional data may comprise a pseudo-domain indicating that additional data is being requested. The response to the request for data further may comprise an indication of an amount of the additional data that is available. The response may further comprise a pseudo-Internet Protocol address. The pseudo-Internet Protocol address may comprise the indication of the amount of the additional data that is available.

A method for performing data transfer implemented in a computer system comprises transmitting a request for data using User Datagram Protocol, receiving a response to the request for data using the User Datagram Protocol, the response comprising a portion of the requested data that fits in a User Datagram Protocol packet and an indication of an amount of additional data that is available, and transmitting a number of requests for additional data using the User Datagram Protocol, the number of requests based on the amount of additional data that is available. The transmitted request for data may include a domain. The transmitted request for data may comprise a lookup request for a domain sent to a Domain Name Server Blacklist/Real-time Blackhole List. The response may further comprise a pseudo-Internet Protocol address. The pseudo-Internet Protocol address may comprise the indication of the amount of additional data that is available. The request for additional data may comprise a pseudo-domain indicating the amount of additional data that is available.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
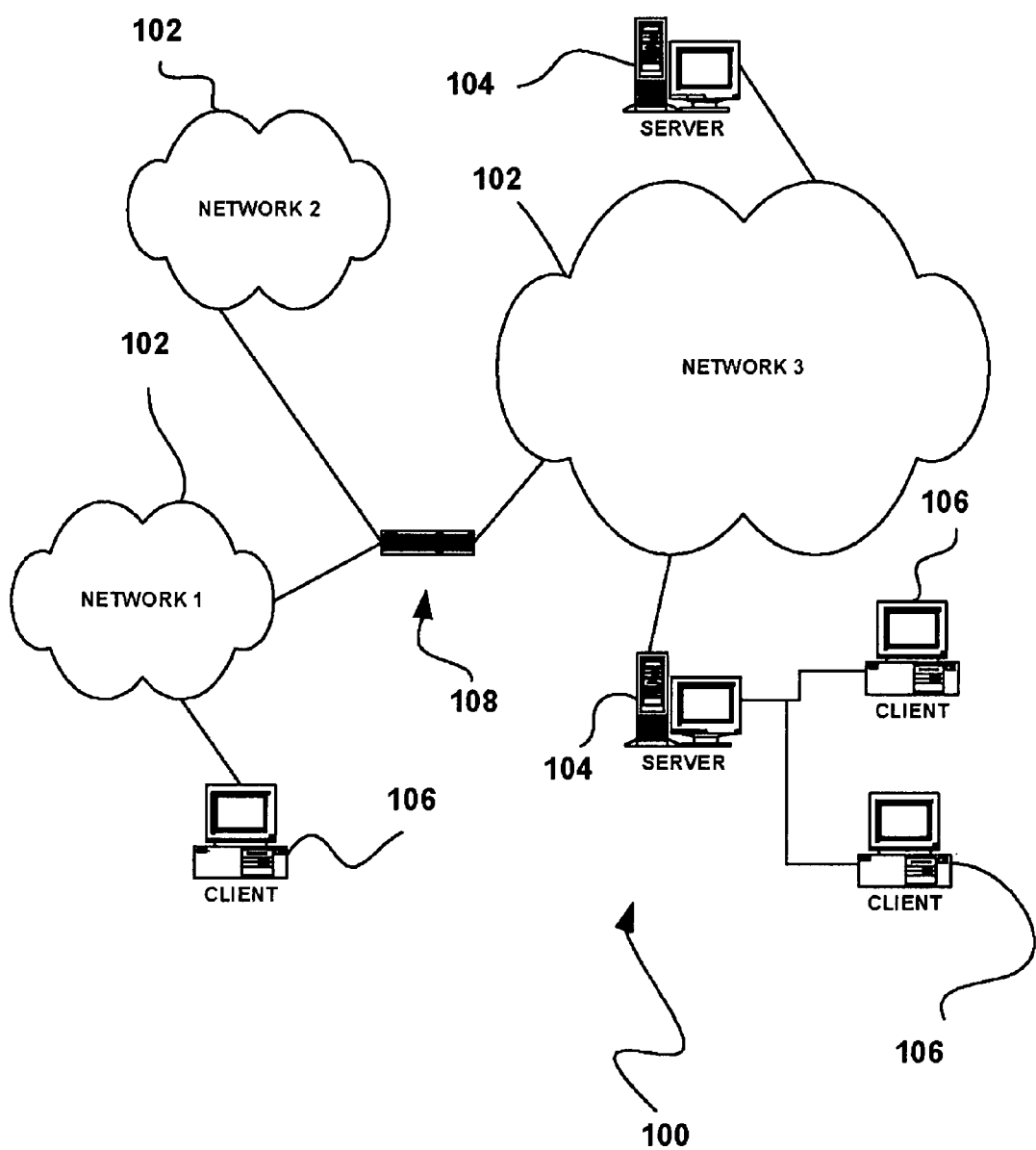
FIG. 1 is an exemplary block diagram of a network architecture in which the present invention may be implemented.

The present invention provides a technique by which UDP can be used to send messages that include more data than can be handled by a single UDP packet by FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a domain name service (DNS) server, desktop computer, laptop computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

A Domain Name System (DNS) associates various sorts of information with called domain names and it serves as the "phone book" for the Internet. The DNS translates human-readable computer hostnames into the IP addresses that networking equipment needs for delivering information. DNSs also store other information. One such type of information is known as a DNS Blacklist (DNSBL) or Real-time Blackhole List (RBL). A DNSBL or RBL DNS functionality is a means by which an Internet site may publish a list of IP addresses that some people may want to avoid and in a format which can be easily queried by computer programs on the Internet. The technology is built on top of the Internet Domain Name System, or DNS. DNSBLs are chiefly used to publish lists of addresses linked to spamming or phishing. Most mail transport agent (mail server) software can be configured to reject or flag messages which have been sent from a site listed on one or more such lists.

Figure 2:
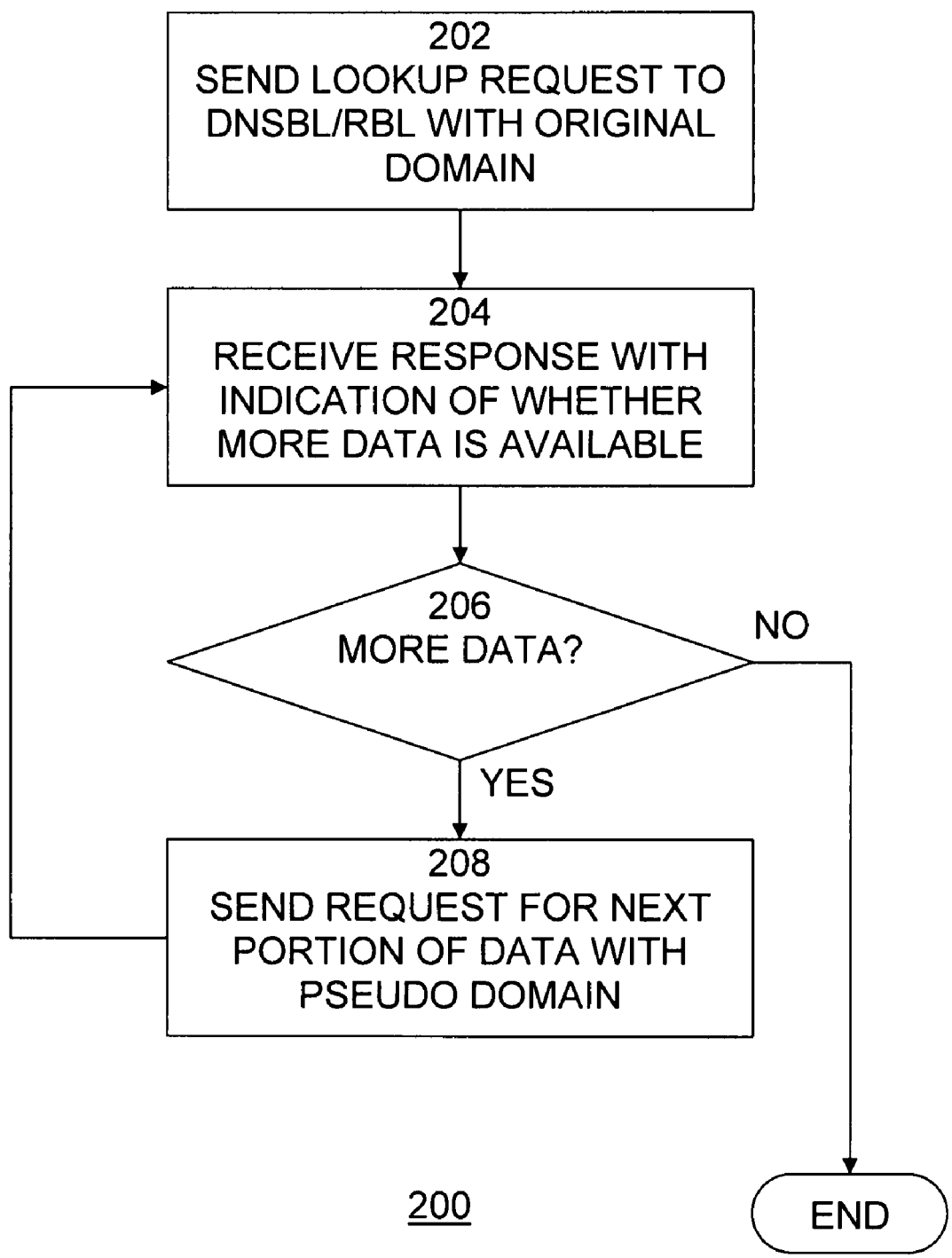
FIG. 2 is an exemplary flow diagram of a process for multiple packet data transfer.
Figure 3:
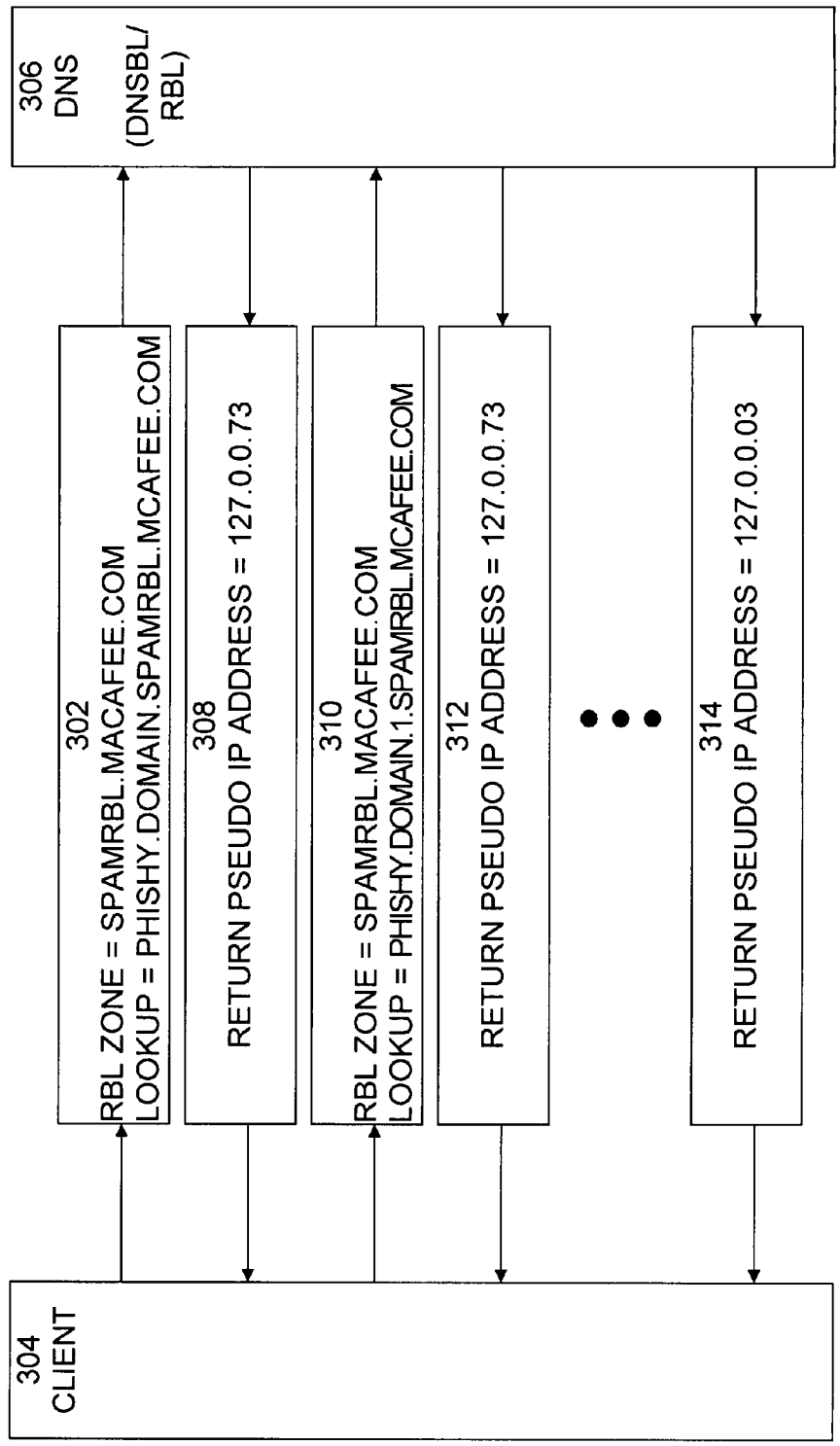
FIG. 3 is an exemplary data flow diagram of a process for multiple packet data transfer.
Figure 4:
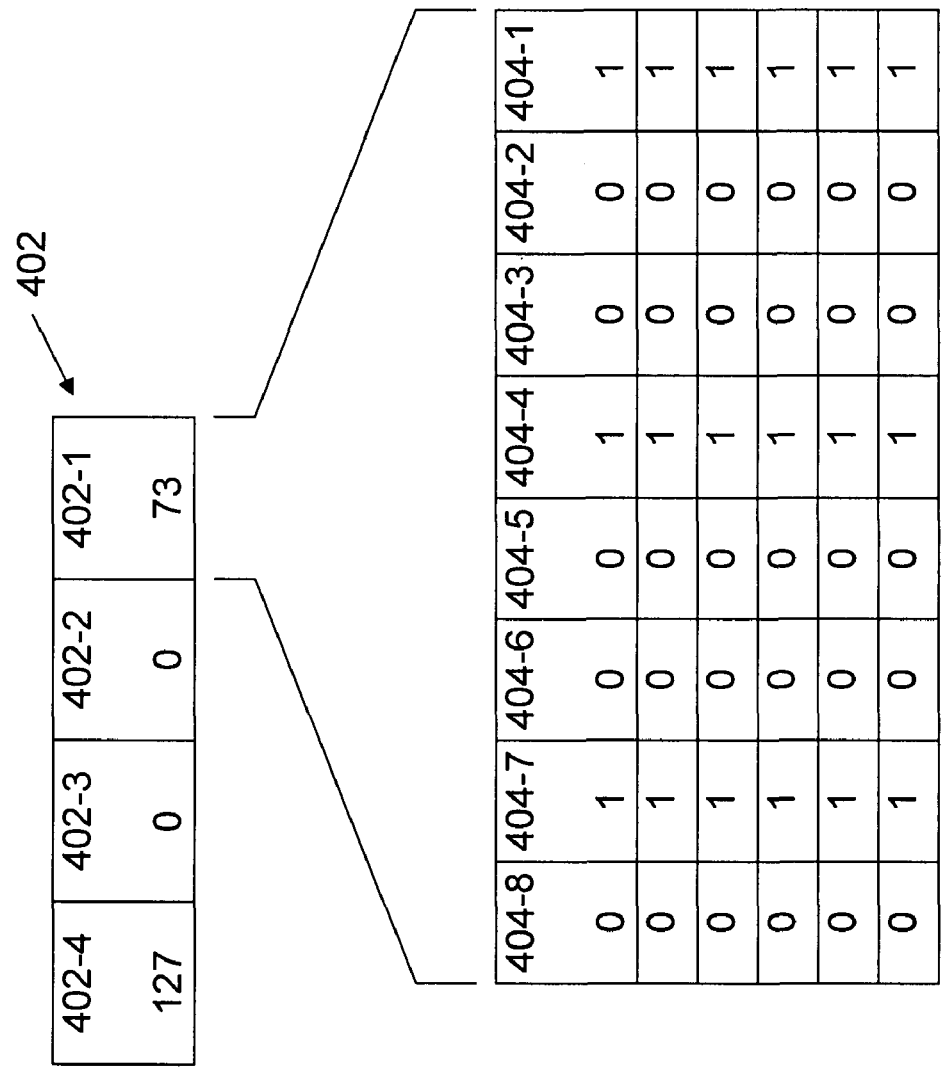
FIG. 4 is an exemplary format of a pseudo IP address.

DNSBL/RBL DNS functions commonly use pseudo IP addresses to indicate the status of a domain. For example, a response from a DNSBL/RBL may include a pseudo IP address that includes information about the status of transactions, information identifying electronic content, etc. This mechanism may also be used to send messages or responses that include more data than can be handled by a single UDP packet. An example of such a process 200 is shown in FIG. 2, which is best viewed in conjunction with FIG. 3, which is a data flow diagram of the process shown in FIG. 2, and FIG. 4, which illustrates exemplary formats of such pseudo IP addresses. In step 202, a request 302 for a record lookup is sent from client 304 to DNS (DNSBL/RBL) 306. In this example, the RBL zone is assumed to be "spamrbl.mcafee.com", and the record lookup is for the domain "phishy.domain.spamrbl.mcafee.com". In step 204, DNS (DNSBL/RBL) 306 returns a response 308 including an indication of whether additional data is available. For example, the indication of whether additional data is available may include a pseudo IP address, such as "127.0.0.73" 402, including octets 402-1 to 402-4. The pseudo IP address may be encoded with a specific meaning that the text record for the domain is available with more information and further that this information is incomplete, with more being available in a text record for a related pseudo domain. This new pseudo domain is generated by appending a number, in sequence, to the original domain.

If octet 402-1 is treated as a bit field including bits 404-1 to 404-8, then bits 404-1, 404-4 and 404-7 are set in this example. Bit 404-1 indicates there is a text record, bit 404-4 indicates that the domain hosts a suspect phish site, and bit 404-7, for the purposes of this invention, indicates that the text record is incomplete. Bit 404-7 being set here then means that the client should do a further lookup for this request. Thus, in step 206, it is determined that additional data is available for this request. In step 208, a request 310 for the next portion of the data for the request is sent including a pseudo domain such as "phishy.domain.1.spamrbl.mcafee.com". Process 200 then loops to step 204, in which the next response is received. This response 312 might also return "127.0.0.73". Again, bit 7 being set means that a further lookup would yield more information, so the client would query for another pseudo domain, such as "phishy.domain.2.spamrbl.mcafee.com", and so on until the response 314 no longer had bit 7 set, such as "127.0.0.03". When step 206 determines that no more data is available, process 200 ends.

In this example, the pseudo domain sequence would thus be:
phishy.domain.spamrbl.mcafee.com,
phishy.domain.1.spamrbl.mcafee.com,
phishy.domain.2.spamrbl.mcafee.com,
phishy.domain.3.spamrbl.mcafee.com,
phishy.domain.4.spamrbl.mcafee.com,
and so on, until either bit 7 in the response is no longer set, or until the query returns NX_DOMAIN (no such domain).

Variations on the above-described process are possible as well. For example, if it is known in advance how many requests would be needed, the client could send all the secondary partial requests at once rather than serially. This could be encoded in another part of the returned IP address.

For example, a query on foo.bar.rbl.mcafee.com using the above-described process may return:
foo.bar.rbl.mcafee.com=>127.0.0.73
foo.bar.1.rbl.mcafee.com=>127.0.0.73
foo.bar.2.rbl.mcafee.com=>127.0.0.73
foo.bar.3.rbl.mcafee.com=>127.0.0.3

In this example, there are three further requests that could be made to get the complete data. This can be encoded in the returned IP address by returning the count in the next most significant byte:
foo.bar.rbl.mcafee.com=>127.0.3.73 3 more requests
foo.bar.1.rbl.mcafee.com=>127.0.2.73 2 more requests
foo.bar.2.rbl.mcafee.com=>127.0.1.73 1 more request
foo.bar.3.rbl.mcafee.com=>127.0.0.3 0 more requests The first request would thus allow the client to initiate the next three requests concurrently without waiting for a response, which would save time.

It is to be noted that the examples described above, of using multiple requests to obtain responses to DNSBL/RBL lookups that are larger than will fit in one UDP packet, is merely an example of the multiple request mechanism of the present invention. Rather, the present invention contemplates usage in any situation in which the quantity of data to be transferred is greater than will fit in a single UDP packet.

Figure 5:
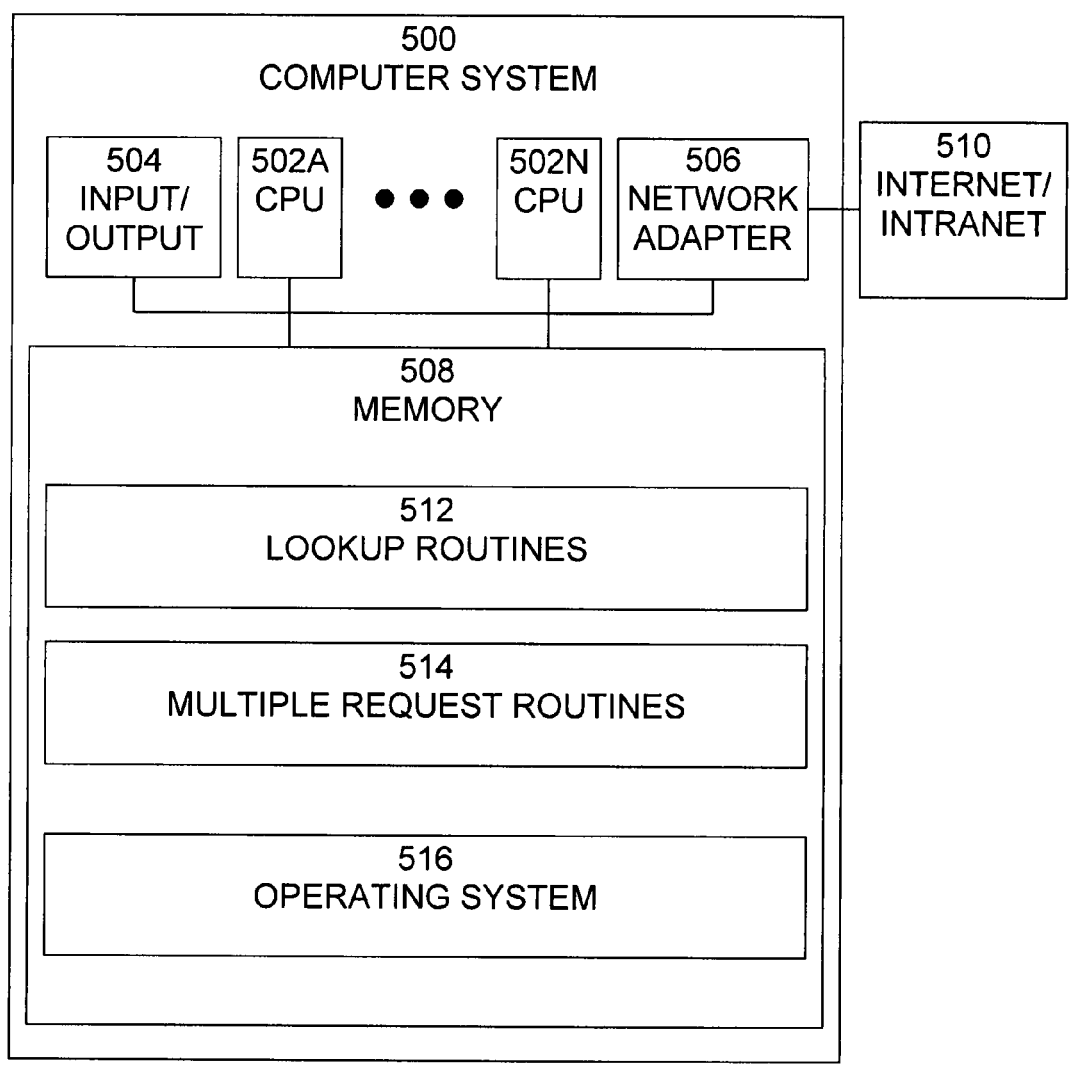
FIG. 5 is an exemplary block diagram of a computer system in which the present invention may be implemented.

An exemplary block diagram of a computer system 500, in which the present invention may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 540, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-

502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPUs 502A-N to perform the functions of computer system 500. Memory 504 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 varies depending upon the function that computer system 500 is programmed to perform. In the example shown in FIG. 5, memory 508 includes lookup routines 512, multiple request routines, 514, and operating system 516. Lookup routines provide the capability to look up domains on DNSBL/RBL servers and analyze the responses to such look ups. Multiple request routines provide the capability to perform multiple requests in order to receive data that is larger than will fit in single received UDP packets. Operating system 516 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for performing data transfer implemented in a computer system comprising:
   transmitting a request for data;
   receiving a response to the request for data comprising a portion of the requested data and an indication that additional data is available; and
   transmitting a request for the additional data which the received response indicated is available;
   wherein the response to the request for data further comprises an indication of an amount of the additional data that is available;
   wherein the response further comprises a pseudo-Internet Protocol address;
   wherein the pseudo-Internet Protocol address comprises the indication of the amount of the additional data that is available.

2. The method of claim 1, wherein the method uses User Datagram Protocol.

3. The method of claim 2, wherein the transmitted request for data includes a domain.

4. The method of claim 3, wherein the transmitted request for data comprises a lookup request for a domain sent to a Domain Name Server Blacklist/Realtime Blackhole List.

5. The method of claim 1, wherein the request for the additional data comprises a pseudo-domain indicating that the additional data is being requested.

6. A method for performing data transfer implemented in a computer system comprising:
   a) transmitting a request for data using User Datagram Protocol;
   b) receiving a response to the request for data using the User Datagram Protocol, the response comprising a portion of the requested data that fits in a User Datagram Protocol packet and an indication that additional data is available;
   c) transmitting a request for the additional data, which the received response indicated is available, using the User Datagram Protocol; and d) repeating steps b)-c) until a response is received indicating that no additional data is available;

wherein the response to the request for data further comprises an indication of an amount of the additional data that is available;

wherein the response further comprises a pseudo-Internet Protocol address;

wherein the pseudo-Internet Protocol address comprises the indication of the amount of the additional data that is available.

7. The method of claim 6, wherein the transmitted request for data includes a domain.

8. The method of claim 7, wherein the transmitted request for data comprises a lookup request for a domain sent to a Domain Name Server Blacklist/Realtime Blackhole List.

9. The method of claim 6, wherein the request for the additional data comprises a pseudo-domain indicating that the additional data is being requested.

10. A non-transitory computer readable storage medium for storing instructions for performing operations comprising:

transmitting a request for data using User Datagram Protocol;

receiving a response to the request for data using the User Datagram Protocol, the response comprising a portion of the requested data that fits in a User Datagram Protocol packet and an indication that additional data is available;

transmitting a request for the additional data, which the received response indicated is available, using the User Datagram Protocol;

wherein the response to the request for data further comprises an indication of an amount of the additional data that is available;

wherein the response further comprises a pseudo-Internet Protocol address;

wherein the pseudo-Internet Protocol address comprises the indication of the amount of the additional data that is available.

11. The non-transitory computer readable storage medium of claim 10, wherein the transmitted request for data includes a domain.

12. The non-transitory computer readable storage medium of claim 11, wherein the transmitted request for data comprises a lookup request for a domain sent to a Domain Name Server Blacklist/Real-time Blackhole List.

13. The non-transitory computer readable storage medium of claim 10, wherein the request for the additional data comprises a pseudo-domain indicating that the additional data is being requested.

14. A method for performing data transfer implemented in a computer system comprising:

a) transmitting a request for data using User Datagram Protocol;

b) receiving a response to the request for data using the User Datagram Protocol, the response comprising a portion of the requested data that fits in a User Datagram Protocol packet and an indication of an amount of additional data that is available; and c) transmitting, using the User Datagram Protocol, a number of requests for the additional data which the received response indicated is available, the number of requests based on the amount of additional data that is available;

wherein the response further comprises a pseudo-Internet Protocol address;

wherein the pseudo-Internet Protocol address comprises the indication of the amount of the additional data that is available.

15. The method of claim 14, wherein the transmitted request for data includes a domain.

16. The method of claim 15, wherein the transmitted request for data comprises a lookup request for a domain sent to a Domain Name Server Blacklist/Realtime Blackhole List.

17. The method of claim 14, wherein each of the number of requests for the additional data comprises a pseudo-domain indicating the amount of the additional data that is available.

18. A method, comprising:

transmitting a request for data;

receiving a response to the request for data comprising a portion of the requested data and an indication that additional data is available; and transmitting a request for the additional data which the received response indicated is available;

wherein the request for the additional data includes a pseudo-domain indicating that the additional data is being requested, and the pseudo-domain is generated by appending a number, in sequence, to the domain included in the transmitted request for data.

19. A non-transitory computer readable storage medium for storing computer code for performing steps comprising:

transmitting a request for data;

receiving a response to the request for data comprising a portion of the requested data and an indication that additional data is available; and transmitting a request for the additional data which the received response indicated is available;

wherein the request for the additional data includes a pseudo-domain indicating that the additional data is being requested, and the computer code is operable such that the pseudo-domain is generated by appending a number, in sequence, to the domain included in the transmitted request for data.

20. A system, comprising:

a processor for:
transmitting a request for data;
receiving a response to the request for data comprising a portion of the requested data and an indication that additional data is available; and
transmitting a request for the additional data which the received response indicated is available;
wherein the request for the additional data includes a pseudo-domain indicating that the additional data is being requested, and the system is operable such that the pseudo-domain is generated by appending a number, in sequence, to the domain included in the transmitted request for data.

* * * * *